United States Patent Office 3,845,020
Patented Oct. 29, 1974

3,845,020
FACTICE-LIKE MATERIALS BASED ON POLYESTERS
Thomas G. Harris, Lancaster, Pa., assignor to Armstrong Cork Company, Lancaster, Pa.
No Drawing. Filed Jan. 17, 1973, Ser. No. 324,559
Int. Cl. C08g 17/14
U.S. Cl. 260—75 TN          8 Claims

ABSTRACT OF THE DISCLOSURE

Factice-like materials are readily formed from certain polyesters by the relatively inexpensive direct method of cooking with sulfur. These factice-like materials are formed from polyesters which contain unsaturation introduced into the polyester molecule by either a tetrahydrophthalic anhydride-type reactant or an unsaturated glycol-type reactant such as trimethylolpropane monoallylether. These factice-like materials range from white to light yellow in color and possess the lightness in color of the oil factices heretofore made by the sulfur monochloride method. These faction-like materials also possess superior oil resistance.

BACKGROUND OF THE INVENTION

Field of the Invention

This invention relates to factice-like materials which are useful as rubber processing aids and may be used as direct replacements for oil factices commercially available in the manufacture of products such as hose, gaskets, sheeting, erasers, and industrial rolls.

DESCRIPTION OF THE PRIOR ART

It is known from U.S. Pat. 3,574,691 to make factice-like products by reacting anhydrous polyunsaturated compounds, including esters of unsaturated fatty acids and alkanepolyols, with an anhydrous mixture of disulfur dichloride and a phosphorus halide. Sulfur vulcanizable polyurethanes are known from U.S. Pat. 3,686,147. Generally, commercially available oil factices are prepared by the reaction of sulfur or sulfur chloride with unsaturated oils such as rapeseed oil and castor oil. White oil factices are prepared by reacting vegetable oils with sulfur monochloride while those prepared by reaction with sulfur are generally of (dark) brown color.

SUMMARY OF THE INVENTION

We have now discovered that factice-like materials primarily of light color and excellent properties can be prepared by reacting certain unsaturated polyesters with sulfur. The unsaturated polyesters are the condensation products of phthalic anhydride and/or tetrahydrophthalic anhydride, with an unsaturated alcohol such as trimethylolpropane monoallylether, and/or polyoxyalkylene glycol, and alkylene glycol. In forming unsaturated, and the other reactants are proportioned to tailor the properties to those desired in the final factice-like material. In any event, the condensation product must contain at least 5 mol percent of unsaturated reactants, and a maximum of up to 70 mol percent of unsaturated reactants can be used. The viscosity of the unsaturated polyester can be adjusted by reaction with diisocyanates to yield materials of greater molecular weight, and the unsaturated polyesters can, in addition, be blended with conventional vegetable oils to extend the unsaturated polyester as desired.

DESCRIPTION OF THE PREFERRED EMBODIMENT

The polyester resins which form the basis for the factice-like materials of this invention are based on introducing unsaturation into the reaction product of the aromatic dicarboxylic acid, anhydride or ester, and a polyoxyalkylene glycol. The unsaturation is provided in the acid portion of the reaction product by incorporating tetrahydrophthalic acid or anhydride as one of the polyester reactants and/or in the alcohol portion of the reaction product by incorporating a diol having an allyl unsaturated group pendant from the diol chain, more specifically, trimethylolpropane monoallylether. In forming the polyester, between about 5 and 70 mol percent of the reactants contain unsaturation. In addition to the polyoxyalkylene glycol, alkylene glycols of the formula HO—R—OH may be used wherein R in the formula is an alkylene radical of 2 to 6 carbon atoms. The polyoxyalkylene diols generally have average molecular weights in the range of about 400 to 4,000, examples of typical diols being polyoxyethylene glycols, polyoxypropylene glycols and polyoxyethylene-propylene glycols. In general, polyesters useful in forming the novel factice-like materials are the elastomeric types such as those described for forming polyurethane millable gums in Harris, U.S. Pat. 3,703,498.

Factice-like materials may be formed from unsaturated polyesters which are the condensation products of 50 mol percent acid reactants and 50 mol percent alcohol reactants. Of the acid reactants, 0 to 50 mol percent may be a member selected from the group consisting of phthalic anhydride, o-phthalic acid and lower alkylesters of o-phthalic having 1 to 3 carbon atoms in the alkyl groups and 0 to 50 mol percent may be tetrahydrophthalic acid or the anhydride of tetrahydrophthalic acid. Of the alcohol reactants, 0 to 50 mol percent may be trimethylolpropane monoallylether or glycerol monoallylether; 0 to 50 mol percent may be an alkylene glycol, the alkylene radical containing 2 to 6 carbon atoms. A preferred class of unsaturated polyester resins are the condensation products of 5 to 20 mol percent phthalic anhydride; 30–45 mol percent tetrahydrophthalic anhydride; 2 to 10 mol percent trimethylolpropane monoallylether; 15 to 37 polyoxyethylene glycol having an average molecular weight of about 400, and 15 to 25 mol percent ethylene glycol.

The factice-like materials are prepared by reacting the unsaturated polyester resin with 5 to 15 percent by weight of sulfur based on the weight of the mixture at a temperature within the range of about 275° to 375° F. for a period of time sufficient to form a semi-cured, rubbery, crumb-like mass. The sulfur utilized in factice formation may be elemental sulfur and/or the available sulfur from conventional accelerators. Generally larger amounts of sulphur are required when elemental sulfur is used alone, and the accelerators speed the factice-forming reaction.

Generally speaking, reaction times of between about 1 and 10 hours are required; the shorter reaction times when accelerators, having available sulfur for reaction, are used. Examples of such accelerators are benzothiazyl disulfide, 2 mercapto-benzothiazole and and dipentamethylene thiuram tetrasulfide.

Prior to forming the factice-like material by the addition of sulfur and the reaction therewith, it is possible to chain extend the polyesters with small amounts of diisocyanates to adjust molecular weights as desired, and in addition, it is possible to form blends of the polyesters with vegetable oils prior to the sulfur vulcanization to form modified materials. Chain extension with a diisocyanate can be performed toward the end of the factice formation step to yield a crumbly material which is easily handled and of reduced odor.

The factice-like materials made in accordance with this invention are light in color and possess the whiteness of oil factices made previously by the sulfur monochloride method. They are superior in oil resistance to the highly resistant oil factices based on castor oil. The direct sulfur reaction is relatively inexpensive compared with the sulfur monochloride method used in preparing white oil factices, since the sulfur monochloride method requires predrying of the oil and washing the product to remove traces of chlorine and hydrogen chloride since even traces interfere with the action of organic accelerators in later cures.

The following examples will serve to more fully illustrate the invention:

Example 1

86.0 parts by weight of an unsaturated polyester of composition,

| Ingredients: | Mol percent |
| --- | --- |
| Phthalic Anhydride | 16.67 |
| Tetrahydrophthalic Anhydride | 33.33 |
| Polyoxyethylene Glycol (M.W. 400) | 10.33 |
| Ethylene Glycol | 39.67 |
| | 100.00 | acid number 3.06, and hydroxyl number 22.54, were heated with 14.0 parts by weight sulfur at 320° F. until a factice-like material formed (approximately five hours).

The factice-like material compounded as follows:

| Ingredients: | Parts by wt. |
| --- | --- |
| Factice | 100.0 |
| SRF Black | 20.0 |
| MT Black | 40.0 |
| Cadmium Stearate | 0.5 |
| Sulfur | 2.0 |
| 2,2' Benzothiazyl Disulfide | 4.0 |
| 2-Mercapto Benzothiazole | 2.0 |
| Partial Complex of Zinc Chloride and 2,2'-Benzothiazyl Disulfide | 1.0 | sheeted, and cured thirty minutes at 320° F., displayed a tensile strength of 817 p.s.i., an elongation of 100%, and a hardness (Shore A) of 75. See also Table I.

Example 2

86.0 parts by weight of an unsaturated polyester of composition,

| Ingredients: | Mol percent |
| --- | --- |
| Phthalic Anhydride | 16.64 |
| Tetrahydrophthalic Anhydride | 33.36 |
| Polyoxyethylene Glycol (M.W. 400) | 21.11 |
| Ethylene Glycol | 28.89 | acid number 1.78, and hydroxyl number 25.34, were heated with 14.0 parts by weight of sulfur at 320° F. until a factice-like material formed (approximately 4½ hours). See Table I.

Example 3

86.0 parts by weight of an unsaturated polyester of composition,

| Ingredients: | Mol percent |
| --- | --- |
| Phthalic Anhydride | 50.00 |
| Trimethylolpropane Monoallylether | 29.17 |
| Polyoxyethylene Glycol (M.W. 400) | 10.53 |
| Ethylene Glycol | 10.30 | acid number 0.36, and hydroxyl number 36.58, were heated with 14.0 parts by weight of sulfur at 320° F. until a factice-like material formed (approximately 2½ hours).

This factice-like material compounded, sheeted, and cured as in Example 1 exhibited a tensile strength of 1908 p.s.i., an elongation of 60%, and a hardness (Shore A) of 95. See also Table I.

Example 4

86.0 parts by weight of an unsaturated polyester of composition,

| Ingredients: | Mol percent |
| --- | --- |
| Phthalic Anhydride | 44.07 |
| Maleic Anhydride | 5.93 |
| Polyoxyethylene Glycol (M.W. 400) | 14.12 |
| Ethylene Glycol | 35.18 | acid number 2.07, and hydroxyl number 21.96 were heated with 14.0 parts by weight sulfur at 320° F. This thickened in five hours but did not form a factice-like material.

Example 5

| Ingredients: | Parts by wgt. |
| --- | --- |
| Polyester of Example 1 | 38.1 |
| Bodied Castor Oil | 51.4 |
| Sulfur | 10.5 | were heated at 320° F. until a factice-like material formed (approximately two hours).

This factice-like material employed with a medium acrylonitrile-butadiene rubber,

| Ingredients: | Parts by wt. |
| --- | --- |
| Rubber | 75.0 |
| Factice-Like Material | 25.0 |
| SRF Black | 20.0 |
| MT Black | 40.0 |
| Cadmium Stearate | 0.5 |
| Sulfur | 1.5 |
| 2,2'- Benzothiazyl Disulfide | 4.0 |
| 2-Mercapto Benzothiazole | 2.0 |
| Partial Complex of Zinc Chloride and 2,2'-Benzothiazyl Disulfide | 1.0 | yielded a material when sheeted and cured thirty minutes at 320° F. that displayed a tensile strength of 2108 p.s.i., an elongation of 230%, a hardness (Shore A) of 71, and a compression set (70 hours at 212° F.) of 40. See also Table I.

Example 6

| Ingredients: | Parts by wt. |
| --- | --- |
| Polyester of Example 2 | 38.1 |
| Raw Castor Oil | 51.4 |
| Sulfur | 10.5 | were heated at 320° F. until a factice-like material formed (approximately five hours).

A measure of the secondary transition temperature of this material showed a value of −34° C. See also Table I.

Example 7

| Ingredients: | Parts by wt. |
| --- | --- |
| Polyester of Example 3 | 38.1 |
| Bodied Castor Oil | 51.4 |
| Sulfur | 10.5 | were heated at 320° F. until a factice-like material formed (approximately 2.25 hours).

This material was compounded with a medium acrylonitrile-butadiene rubber as follows:

| Ingredients: | Parts by wt. |
| --- | --- |
| Rubber | 50.0 |
| Factice | 50.0 |
| SRF Black | 20.0 |
| MT Black | 40.0 |
| Cadmium Stearate | 0.5 |
| Sulfur | 1.5 |
| 2,2' Benzothiazyl Disulfide | 4.0 |
| 2-Mercapto Benzothiazole | 2.0 |
| Partial Complex of Zinc Chloride and 2,2'-Benzothiazyl Disulfide | 1.0 | sheeted, and cured thirty minutes at 320° F. The cured material displayed a tensile strength of 1550 p.s.i., an elongation of 120%, a hardness (Shore A) of 80 and a compression set (70 hours at 212° F.) of 60. See also Table I.

The factice-like materials prepared in Examples 1 and 7 were also compounded in identical medium acrylonitrile-butadiene rubber compositions, sheeted, and cured (25' at 327° F.) These yielded cured materials displaying the properties shown in Table I.

TABLE I

|   | 1 | 2 | 3 | 4 | 5 | 6 |
|---|---|---|---|---|---|---|
| Tensile strength, p.s.i. | 1,688 | 1,496 | 1,279 | | 1,364 | 1,121 | 1,107 |
| Elongation, percent | 220 | 190 | 140 | | 210 | 240 | 204 |
| Hardness, Shore A | 65 | 68 | 73 | | 64 | 59 | 60 |
| ΔV ASTM =1 oil (70 hours at 212° F.) | −4.6 | −5.2 | | | −6.1 | −6.1 | −5.6 |
| ΔV ASTM =3 oil (70 hours at 212° F.) | +3.3 | +3.0 | | | +6.0 | +8.0 | +6.7 |

Example 8

89.5 parts by weight of an unsaturated polyester of position,

| Ingredients | Mol percent |
|---|---|
| Phthalic Anhydride | 16.67 |
| Tetrahydrophthalic Anhydride | 33.33 |
| Polyoxyethylene Glycol (M.W. 400) | 10.50 |
| Ethylene Glycol | 39.50 | acid number 1.66, and hydroxyl number 19.62, were heated with 10.5 parts by weight sulfur at 320° F. until a factice-like material formed (approximately five hours).

This factice-like material compounded as in Example 1 was examined using the Monsanto Rheometer.

|   | From Example 1 | From Example 8 |
|---|---|---|
| Initial viscosity (in.-lb.) | 7.0 | 6.10 |
| Minimum viscosity (in.-lb.) | 1.0 | 23.0 |
| Maximum viscosity (in.-lb.) | 42.5 | 100.0 |
| Scorch time, 2 in.-lb. (mins.) | 4.5 | 3.2 |
| Time to 90% Optimum (mins.) | 15.2 | 7.3 |
| Time to optimum (mins.) | 26.7 | 10.5 |
| Cure rate times (mins.) | 10.7 | 4.1 |

Example 9

88.3 parts of the unsaturated polyester of Example 8 were chain extended with 1.3 parts of toluene diisocyanate. This was then heated with 10.4 parts of sulfur at 320° F. until a factice-like material formed (approximately three hours).

The factice-like material was examined in a blend with a polyester resin as shown in Table II.

Example 10

87.5 parts by weight of an unsaturated polyester of composition,

| Ingredients: | Mol percent |
|---|---|
| Phthalic Anhydride | 33.34 |
| Tetrahydrophthalic Anhydride | 16.67 |
| Polyoxyethylene Glycol (M.W. 400) | 10.50 |
| Ethylene Glycol | 39.50 | acid number 1.10, and hydroxyl number 26.64, were reacted with 2.2 parts by weight toluene diisocyanate. 10.5 parts of sulfur were then added and the whole heated at 320° F. until a factice-like material formed (approximately four hours).

This factice-like material was examined in a blend with a polyester resin as shown in Table II.

Example 11

87.1 parts by weight of an unsaturated polyester of composition,

| Ingredients: | Mol percent |
|---|---|
| Phthalic Andydride | 33.33 |
| Tetrahydrophthalic Anhydride | 16.67 |
| Polyoxyethylene Glycol (M.W. 400) | 8.50 |
| Ethylene Glycol | 41.50 | acid number 1.13, and hydroxyl number 30.59, were chain extended with 2.7 parts by weight of toluene diisocyanate. This was then blended with 10.2 parts by weight of sulfur and heated at 320° F. until a factice-like material formed (approximately five hours).

The factice-like material was examined in a blend with a polyester resin as shown in Table II.

TABLE II

| Ingredients: | Parts by weight |
|---|---|
| Polyester resin | 100.0 |
| Fractice-like material | 25.0 |
| SRF black | 40.0 |
| MT black | 80.0 |
| Cadmium stearate | 0.5 |
| Sulfur | 2.0 |
| 2,2'-benzothiazyl disulfide | 4.0 |
| 2-mercapto benzothiazole | 2.0 |
| Partial complex of zinc chloride and 2,2'-benzothiazyl disulfide | 1.0 |

|   | 9 | 10 | 11 |
|---|---|---|---|
| Tensile strength, p.s.i. | 1,417 | 1,450 | 1,125 |
| Elongation, percent | 250 | 300 | 310 |
| Hardness (Shore A) | 91 | 93 | 96 |

Example 12

89.5 parts by weight of an unsaturated polyester of composition,

| Ingredients: | Mol percent |
|---|---|
| Phthalic Anhydride | 50.00 |
| Glycerol Monoallylether | 29.00 |
| Polyoxyethylene Glycol (M.W. 400) | 10.50 |
| Ethylene Glycol | 10.50 | acid number 0.78, and hydroxyl number 30.61, were blended with 10.5 parts by weight of sulfur and heated at 320° F. until a factice-like material formed (approximately 3½ hours). This factice-like material is a yellow, spongy, dry material.

Example 13

89.5 parts by weight of an unsaturated polyester of composition,

| Ingredients: | Mol percent |
|---|---|
| Tetrahydrophthalic Anhydride | 50.00 |
| Polyoxyethylene Glycol (M.W. 400) | 15.91 |
| Ethylene Glycol | 34.09 | acid number 1.42, and hydroxyl number 25.86, were blended with 10.5 parts by weight of sulfur and heated at 320° F. until a factice-like material formed (approximately 5½ hours). The factice-like material is almost white in color.

Example 14

87.26 parts by weight of an unsaturated polyester of composition,

| Ingredients: | Mol percent |
|---|---|
| Phthalic Anhydride | 16.67 |
| Tetrahydrophthalic Anhydride | 33.33 |
| Polyoxyethylene Glycol (M.W. 400) | 10.50 |
| Ethylene Glycol | 39.50 | acid number 0.41, and hydroxyl number 27.77, were blended with 1.98 parts by weight of toluene diisocyanate, the whole heated to 275° F. and held at this temperature until the reaction was complete. The material was then cooled to 200° F. and 0.26 parts by weight of tertiary butyl catechol added. 10.5 parts by weight sulfur were then introduced and the temperature increased to 320° F. and held at this temperature until a factice-like material formed (running time approximately 2¼ hours). The factice-like material is dry and of a light tan color.

Example 15

91.5 parts by weight of an unsaturated polyester of composition,

| Ingredients: | Mol percent |
|---|---|
| Phthalic Anhydride | 10 |
| Tetrahydrophthalic Anhydride | 40 |
| Trimethylolpropane Monoallylether | 2 |
| Polyoxyethylene Glycol (M.W. 400) | 30 |
| Ethylene Glycol | 18 | hydroxyl number 21.1 and acid number 0.5, was mixed with 8.5 parts by weight of sulfur in a heavy duty mixer at a temperature of 325° F. The temperature was then gradually raised to 400° F. at which point a factice-like material in the form of dry, olive-colored granules immediately formed.

Examples 16, 17, 18

The polyester of Example 15 was reacted at 320° F. in a heavy duty mixer as shown in the following table. The accelerator referred to below is dipentamethylene thiuram hexasulfide.

| Example | Polyester | Accelerator | Sulfur | Reaction time, hours | Results |
|---|---|---|---|---|---|
| 16 | 98.2 | 1.8 | | | No product (7 hours) |
| 17 | 92.7 | 1.8 | 5.5 | 2 | Tough, darkly colored factice-like material. |
| 78 | 89.0 | 11.0 | | 2½ | Tough, dark factice-like material. |

Example 19

89.26 parts by weight of the polyester shown in Example 15 were reacted in a heavy duty mixer at 320° F. with 1.77 parts by weight of dipentamethylene thiuram hexasulfide and 5.30 parts by weight of sulfur until thickening began (approximately 1½ hours). At this point, the material was cooled to 275° F. and 3.67 parts by weight of toluene diisocyanate introduced. Reaction was continued twenty minutes. The product discharged as a reddish-brown crumb and was almost free of the odor normally associated with a factice.

Example 20

88.41 parts by weight of the polyester shown in Example 15 (hydroxyl number 21.1, and acid number 0.5) were reacted in a heavy duty mixer at 320° F. with 3.54 parts by weight of 2,2'-benzothiazoyl disulfide, 1.77 parts by weight of 2-mercapto benzothiazole, 0.88 parts by weight of a partial complex of zinc chloride and 2,2'-benzothiazyl disulfide, 1.33 parts by weight of sulfur, and 0.44 parts by weight of cadmium stearate until a factice began to form (about 1 hour). It was then cooled to 275° F. and 3.63 parts by weight of toluene diisocyanate were introduced. Reaction was continued until an almost odorless crumb formed.

These polyesters wherein the unsaturation is adjacent to a methylene group readily form factice-like materials. This is illustrated for a polyester-containing tetrahydrophthalate type unsaturation in Examples 1 and 8, for a polyester-containing trimethylolpropane monoallylether unsaturation in Example 3, and for a polyester-containing glycerol monoallylether unsaturation in Example 12. Example 4 illustrates the difficulty in forming a factice from a maleic anhydride type polyester.

Since factices from vegetable oils are limited to the types of oils available and to the level of unsaturation inherent therein, the number of different types available is somewhat restricted. Such is not the case with the polyester factice-like materials, and compositional changes can easily be made to vary the unsaturation, flexibility, hardness and other physical properties.

What is claimed is:

1. A process for the production of factice-like products which comprises blending a liquid unsaturated polyester with, based on the weight of the mixture, from 5 to 15 percent by weight sulfur and reacting the mixture by mixing at a temperature within the range of about 275° to 375° F. for a period of time sufficient to form a semicured, rubbery, crumbly mass, said liquid polyester having an average molecular weight of between about 2,000 and 5,500 and being the condensation product of, in relative proportions;
   (a) 0 to 50 mol percent of a member selected from the group consisting of phthalic anhydride, o-phthalic acid and esters of o-phthalic acid;
   (b) 0 to 50 mol percent of tetrahydrophthalic acid or its anhydride;
   (c) 0 to 50 mol percent of trimethylolpropane monoallylether or glycerol monoallylether;
   (d) 0 to 50 mol percent of a polyoxyalkylene glycol having an average molecular weight of about 400 to 4,000; and
   (e) 0 to 50 mol percent of an alkylene glycol of the formula HO—R—OH wherein R is an alkylene radical of 2 to 6 carbon atoms;
   50 mol percent of said reactants being selected from the acid reactants and 50 mol percent of the reactants being selected from the alcohol reactants with 5 to 70 mol percent of said reactants being unsaturated and selected from (b) and (c).

2. The method in accordance with claim 1 wherein the sulfur is supplied from the group consisting of elemental sulfur and accelerators containing available sulfur.

3. The method in accordance with claim 2 wherein the sulfur is elemental sulfur.

4. The method in accordance with claim 1 wherein the polyester-forming reactants are:
   5–20 mol percent phthalic anhydride;
   30–45 mol percent tetrahydrophthalic anhydride;
   2–10 mol percent trimethylolpropane monoallylether;
   15–37 mol percent polyoxyethylene glycol having an average molecular weight of about 400; and
   15–25 mol percent ethylene glycol.

5. The method in accordance with claim 1 wherein the liquid polyester is chain extended to an average molecular weight of about 10,000 by reaction with a diisocyanate prior to reacting with sulfur.

6. The method in accordance with claim 1 wherein the factice-like product is reacted with up to 1 mol equivalent of a diisocyanate by adding the diisocyanate at the point in the process where the factice is beginning to thicken rapidly.

7. A factice-like product produced by the process of claim 1.

8. A factice-like product produced by the process of claim 4.

References Cited

UNITED STATES PATENTS 3,079,350    2/1963    Bernstein _____ 260—75 NK
3,686,147    8/1972    Massoubre et al. __ 260—75 NP MELVYN I. MARQUIS, Primary Examiner U.S. Cl. X.R.

260—22 T, 75 S, 75 NK, 79.5 C, 873

UNITED STATES PATENT OFFICE
CERTIFICATE OF CORRECTION

Patent No. 3,845,020    Dated  October 29, 1974

Inventor(s)  Thomas G. Harris

It is certified that error appears in the above-identified patent and that said Letters Patent are hereby corrected as shown below:

Column 1, line 21, "faction-like" should read --factice-like--; line 56, after the word "forming" and before the word "unsaturated" insert --the condensation products, all of the acid or alcohol reactant used may be--; line 72, the word "the" (second occurrence) should read --an--.

Column 2, line 8, after "monoallylether" insert --, or glycerol monoallylether--; line 33, after the word "be" and before the word "an" insert --a polyoxyalkylene glycol and 0 to 50 mol percent may be--.

Column 3, Example 4, the Mol percent for the ingredient Ethylene Glycol of "35.18" should read --35.88--.

Column 5, Table I, the column heading --7-- should be added.

Column 7, under Examples 16, 17, 18, Example "78" should read --18--.

Signed and sealed this 7th day of January 1975.

(SEAL)
Attest:

McCOY M. GIBSON JR.                C. MARSHALL DANN
Attesting Officer                  Commissioner of Patents